United States Patent [19]

Kim et al.

[11] Patent Number: 5,070,179

[45] Date of Patent: Dec. 3, 1991

[54] WATER-SOLUBLE COPOLYMERIZED POLYESTER RESIN COMPOSITION

[75] Inventors: Kwang T. Kim; Tae H. Kim; Young S. Kim, all of Seoul, Rep. of Korea

[73] Assignee: Cheil Synthetics Inc., Kyungbuk, Rep. of Korea

[21] Appl. No.: 653,963

[22] Filed: Feb. 12, 1991

[30] Foreign Application Priority Data

Jun. 30, 1990 [KR] Rep. of Korea ............................ 9817

[51] Int. Cl.$^5$ .................. C08G 63/688; C08G 63/695
[52] U.S. Cl. ...................................... 528/272; 528/295; 528/298; 528/302; 528/308; 528/308.6; 528/26; 528/29; 528/41; 528/43
[58] Field of Search ............... 528/272, 295, 298, 302, 528/308, 308.6, 26, 29, 41, 43

[56] References Cited

U.S. PATENT DOCUMENTS 4,940,810  7/1990  Yokelson et al. ................... 556/438

FOREIGN PATENT DOCUMENTS 47-40873  10/1972  Japan .
56-88454  7/1981  Japan .

Primary Examiner—Maurice J. Welsh
Assistant Examiner—Sam A. Acquath

Attorney, Agent, or Firm—Cushman, Darby & Cushman

[57] ABSTRACT

The present invention relates to water-soluble copolymerized polyester resin suitable to produce a polyester film having a good adhesion and surface properties.

That is, the composition of the present invention comprise 50~85 mol % of aromatic dicarbonic acid, 0.5~25 mol % of aromatic dicarbonic acid containing sulfonic acid alkali metallic base and 0.5~25 mol % of dicarbonic acid containing silane system represented by the following formula (I) in the total dicorbonic acid components, wherein the glycol components contained in the composition comprising more than 60 mol % of aliphatic or alicyclic glycol and 1~40 mol % of diethylene glycol or triethylene glycol.

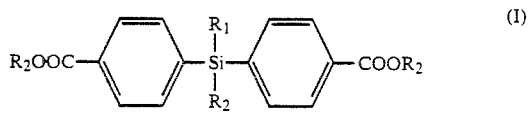

wherein
$R_1$ is aliphatic hydrocarbon group of 1 to 15 carbon atoms, $R_2$ is aliphatic hydrocarbon group of 1 to 4 carbon atoms.

1 Claim, No Drawings

WATER-SOLUBLE COPOLYMERIZED POLYESTER RESIN COMPOSITION

FIELD OF THE INVENTION

The present invention relates to water-soluble copolymerized polyester resin composition for coating primer layers which is suitable to produce the polyester film having a good adhesion and slip property, more particularly, relates to water-soluble copolymerized polyester resin composition providing a good adhesion and surface properties including a friction coefficient to the surface of the film when the one or both surface of the polyester film is coated by the primer layers.

BACKGROUND OF THE INVENTION

A polyester film, particularly biaxial oriented polyethylene terephthalate film is widely used for base film for photosensitive materials, base film for metal vacuum evaporation, film for wrapping materials, base film for magnetic recording materials, film for graphic art and so on in wide variety of fields because of excellent transparancy, dimensional stability, heat-resistance, chemical resistance and electrical properties. In the each use of film, the coating materials, for example, the paints including a sensitizer, matting agent, magnetic material and the like are coated on the biaxial oriented polyester film. However, in spite of excellent physical and chemical properties, biaxial oriented polyester film are lower affinity and adhesion with the coating materials.

Thus, there has been proposed various means for increasing the adhesion and the affinity of the film surface with the coating materials. For example, there have been proposed a method in which the film surface being reacted with the coating materials is coated with the suitable primer layers in the last step, a method in which the film surface is treated with various chemical agents and a method in which the film surface is activated by corona discharge, plasma and IR irradiation.

However, the first method has drawbacks that the adhesion of the base film and polyester films or various coating materials is lowered and it is undesirable economically and technically that a coating process of primer layer is instituted.

Also, the second method provides good adhesion of the film surface and various coating materials, whereas it has drawbacks that handling and treating of the chemicals are difficult and contamination of the environment is raised.

In addition, the last method has a good initial adhesion with the coating materials, whereas it has a drawback that the adhesion is decreased by the passage of time.

Further, there has been known the compositions for primer layer using the water as a solvent. Particularly, it has been proposed the water-solution or water-dispersed solution of polyester copolymer as follows;

(1) Japanese Publication No. Sho 47-40873 describes a method in which polyester is dispersed to water comprising of more than 8 mol % of the compounds containing sulfonic acid metallic base to the total acid and more than 20 mol % of polyethylene glycol to the total glycol.

(2) Japanese Publication No. Sho 56-5476 describes a method in which combination of 3.5~7.5 mol % of the sulfonic acid alkali metallic base being able to form ester as a polyester copolymerization component and 30~100 mol % of diethylene glycol as a glycol component is used.

(3) Japanese Laid-open No. Sho 56-88454 describes a mothod in which combination of resins containing 0.5~10 mol % of aromatic dicarbonic acid containing sulfonic acid metallic base as a polyester copolymerization component and water containing 2~66% of aqueous organic compounds having 60°~200° C. of boiling point as the dispersion solution is used.

However, the method of (1) has a defect of lowering a water-resistance. And, in the method of (2), when the sulfonic acid metallic base being able to form ester is added unsufficiently, although a large quantity of diethylene glycol are used to increase a water-resistance, it is unsatisfied.

As well, a water-resistance is increased to some extent in the method of (3), but this method has a defect unsutable to in-line treatment process as the organic solvent must be used.

In the mean time, the prior methods for improving the friction coefficient of the polyester film include the precipitation induced particle method and particle addition method.

However, these methods are effective to decrease a friction coefficient, but has a defect of exsiting fine particles in the film composition and thereby the problems of lowering a transparancy and producing a voids in film are generated. Particular, the above problems are to be an important obstructions in microfilms and films for photography which are required an excellent transparancy. When a friction coefficient is high, an operation is worse, and in case that a transparancy is low, it is difficult to obtain a clear picture.

SUMMARY OF THE INVENTION

Accordingly, it is an object of the present invention to provide a water-soluble copolymerized polyester resin composition in order to improve a water-resistance which is a defect of usual water-soluble or water-dispersion polyester, to lower a surface property of film, more particularly, a friction coefficient and to allow a good adhesion.

The present invention is characterized by water-soluble copolymerized polyester resin composition comprising 50~85 mol % of aromatic dicarbonic acid, 0.5~25 mol % of aromatic dicarbonic acid containing sulfonic acid alkali metallic base and 0.5~25 mol % of dicarbonic acid containing silane system and their ester derivatives represented by the following formula (I) in the total dicarbonic acid components, wherein the glycol components contained in the composition comprising more than 60 mol % of aliphatic or alicyclic glycol and 1~40 mol % of diethylene glycol or triethylene glycol.

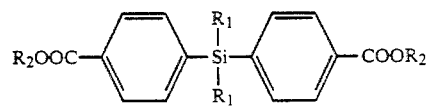

wherein, $R_1$ is aliphatic hydrocarbon group of 1 to 15 carbon atoms, $R_2$ is aliphatic hydrocarbon group of 1 to 4 carbon atoms.

According to the present invention, as the aromatic dicarbonic acid components of water-soluble copolymerized polyester resin which are coated to the base film, terephthalic acid, isophthalic acid, 2,5-dimethyl terephthalic acid, 1,4-naphthalene dicarbonic acid, 2,5-naphthalene dicarbonic acid, 2,6-naphthalene dicarbonic acid, bis phenyl dicarbonic acid, 1,2-bis (phenoxy) ethane-p,p'-dicarbonic acid and their ester formative derivatives are used. In addition, Examples of non-aromatic dicarbonic acid components are malonic acid, dimethyl malonic acid, adipic acid, glutaric acid, sebacic acid and their ester formative derivatives.

In the carbonic acid components constituting polyester segments, at least 50 mol % of an aromatic dicarbonic acid or ester formative derivatives thereof must be contained, and particularly, terephthalic acid and isophthalic acid are preferable as an aromatic dicarbonic acid components.

When aromatic dicarbonic acid components are lower than 50 mol %, the blocking phenomenon is generated from the surface of combined film coated water-soluble resin composition to the base film and thus the operation efficiency is worse.

The ester formative sulfonic acid alkali metallic base derivatives constituting a water-soluble resin composition of the present invention are alkali metallic base or their ester formative derivatives of sulfo terephthalic acid, 5-sulfo isophthalic acid, 4-sulfo phthalic acid, 4-sulfo naphthalene-2,7-dicarbonic acid, sulfo-p-xylene glycol, 2-sulfo-1,4-bis (hydroethoxy) benzene and the like, especially preferable compound is 5-sodium sulfo isophthalic acids or ester formative devivatives thereof.

The ester formative sulfonic acid alkali metallic base derivative should be added in amount of 0.5~25 mol %, more preferably 7~15 mol % to the total dicarbonic acid components. If the amount is less than 0.5 mol %, an adhesive effect is not enough and a water-solubility is lower. If the amount is more than 25 mol %, the operation efficiency is worse due to the generation of the blocking phenomenon on the film surface on which is coated a water-soluble resin composition and a water-resistance is lower, and it is difficult to obtain the copolymerization polyesters having a high copolymerization value by means of the melting polymerization method which a melting viscosity increase.

The preferable example of the dicarbonic acid containing silane system and ester formative derivative employed in the present invention is bis (4-carboxy phenyl) dimethyl silane dimethyl ester, and the added amounts are preferably 0.5~25 mol %, more preferably 5~20 mol % of total amount of dicarbonic acid. If the less than 0.5 mol %, the slip property, windability and water-resistance are worse and if the added amounts are more than 25 mol %, an adhesion is better due to decrease of the glass transition temperature, but the blocking-resistance is lower and a friction coefficient is higher. And, the glass transition temperature of such copolymerized polyester resin should be over 50° C. and more preferably, over 60° C.

The representative examples of the aliphatic or alicyclic glycols employed in the present invention include ethylene glycol, 1,2-propanediol, 1,3-propanediol, 1,4-butanediol, 2,4-dimethyl-2-ethylbenzene-1,3-diol, neophenthyl glycol, 1,5-pentanediol, 1,6-hexanediol, 1,8-octanediol, p-xylene glycol, 1,2-cyclohexane dimethanol and the like and the use of ethylene glycol, 1,3-propanediol and 1,4-butanediol are more preferable. These glycol components may be employed alone or mixture of two or more thereof. And, it is preferable to copolymerize diethylene glycol or triethylene glycol within an amount of not more than 40 mol % of the total amount of the diol components. More particularly, it is desirable to add 5 to 15 mol % to increase an adhesion. But, when diethylene glycol or triethylene glycol components are used more than 20 mol %, a processing property is lower due to the increase of the friction coefficient of the film.

The solid content of water-soluble resin composition in this invention is preferably below 20 wt %, more preferably 1~8 wt %. Also, the viscosity of coating solution is preferably below 100 cps, more preferably below 10 cps. The coating amounts of the solution is 0.01~20 g/m², preferably 0.1~10g/m². And, the thickness of coating is 0.005~20μ and preferably 0.01~5μ. When it is below 0.005μ, an adhesion is not enough and in case that it is above 20μ, the mechanical properties of film are lower. The methods of coating can be applied the conventional methods.

The present invention will further be illustrated by the following examples, in which the properties of the films were measured as follows;

(1) Roughness of the film (center line average)

The average roughness of the film central line is measured by using the two-dimension roughness system (KOSAKA SE-3H)

(2) Friction coefficient

The stational and dynamical friction coefficient were measured by using the Slippery-meter of Orient Tester Co. according to the method of ASTM D-1894 under a load of 200 g.

(3) Transparancy (HAZE)

Turbidity was measured by using Automatic NDH-20 of Japanese Electronic and Color Co. and was recorded as "HAZE" a reciprocal of the ratio of the scattering light to total light.

(4) Adhesion

The resin composition as shown in the Table 1 was coated on the film coated a water-soluble copolymerized polyester resin, and dried and then cracked for a lattice at intervals of 1 mm and sealed fully with the cellophane adhesive tape (3M Inc. 610) to not flowin for an air, and seperated suddenly. Then, the numbers of scale seperated in 500 of lattices at intervals of 1 mm were counted and represented x/500.

TABLE 1

| RESIN COMPOSITION FOR EVALUATION (Coating composition for mat layer) | |
|---|---|
| acryl polyol | 6 parts |
| isocyanate | 5.1 parts |
| silica (Fuji Davsion Cyroid 308) | 4 Parts |
| CAPB | 4 parts |
| toluene | 1.5 wt % |
| MEK | 55 wt % |
| methyl cellosolve | 30 wt % |

EXAMPLE 1

(A) Preparation of a water-soluble copolymerized polyester resin 89.24 parts of dimethyl terephthalic acid, 71.78 parts of dimethyl isophthalic acid, 20.7 parts of dimethyl 5-sodium sulfo isophthalic acid, 32.8 parts of bis (4-carboxy phenyl) dimethyl silane, 124 parts of ethylene glycol, 0.1 parts of zinc acetate and 0.06 parts of calcium acetate were mixed and methanols were removed from the mixture at the temperature of 140°~220° C. After the ester exchange reaction was performed, 0.06 parts of trimethyl phosphate, 0.06 parts of antimony trioxide and 7.2 parts of diethylene glycol were added.

And then, the temperature was increased from 240° C. to 280° C. for 1 hour and the pressure was decreased from ambient pressure to 0.3 mmHg to remove ethylene glycol generated, and the reaction was maintained to the above conditions for 40 minute to produce the copolymerized polyester resin of IV[$\eta$]=0.45.

The composition of the resulting copolymerized polyester resin was shown in TABLE 2.

A polyoxyethylene nonyl phenyl ether of NS-208.5 manufactured by Nippon Oil and Fats Co., Ltd. as an surface active agent was added to the resultant water-soluble copolymerizated polyester to be 1 wt % of solid content concentration to prepare the coating solution adjusted to 4 wt % of solid content concentration of resin.

(B) Preparation of the polyester film

A polyethylene terephthalate having intrinsic viscosity of 0.65 in O-chlorophenol at 25° C. was melted and extruded by extruder, and cooled suddenly on the drum of 40° C. to obtain a unstreched film having 1350 μm of thickness.

And then the unstreched film was streched in the moving direction of the film to 3.6 times to original length, coated with water-soluble copolymorized polyester prepared above, stretched in the horizontal direction to 3.9 times at temperature of 105° C. and heat-treated at the temperature of 200° C. for 10 seconds, thereby biaxial oriented polyester film having primer coating layer which is 0.1 g/m² of the average coating amounts and 100μ of thickness was obtained.

In the obtained film, an adhesion, surface properties and a friction coefficient of the treated surface were measured and the results are shown in TABLE 2.

EXAMPLES 2~5 AND COMPARATIVE EXAMPLES 1~3

(A) Preparation of a water-soluble copolymerized polyester resin

Example 1 (A) was repeated except that the composition ratio of dimethyl terephthalic acid, dimethyl isophthalic acid, dimethyl-5-sodium sulfo isophthalic acid and bis (4-carboxy phenyl) dimethyl silane and the composition ratio of ethylene glycol, diethylene glycol and triethylene glycol were changed, thus the copolymerzed polyester having composition as shown in Table 2 was prepared.

And, the coating solution was prepared by using the method as same as (A) of Example 1 except for using the copolymerized polyester prepared above.

(B) Preparation of the polyester film

Example 1 (B) was repeated except that the coating solution prepared in the above (A) was used, thus the biaxial oriented polyester films having the primer coating layer were obtained.

And, in the obtained polyester film, an adhesion, surface properties and a friction coefficient of the treated surface were measured and the results are shown in Table 2.

It is apparent from Table 2 that in case of the absence of dicarbonic acid components having silane system, a friction coefficient was increased suddenly and a water-resistance was worse.

TABLE 2

| | Composition of copolymerized polyester resins. | | | | | | | Friction coefficient | | | |
|---|---|---|---|---|---|---|---|---|---|---|---|
| | Dicarbonic acid components (mol %) | | | | Glycol components (mol %) | | Surface roughness | stational friction | dynamical friction | Turbidity | |
| | DMT | DMI | DMS | BDS | DGE | TEG | (Ra) | coefficient | coefficient | (Haze) | Adhesion |
| Example 1 | 46 | 37 | 7 | 10 | 7 | — | 0.008 | 0.24 | 0.18 | 0.5 | 0/500 |
| Example 2 | 50 | 30 | 7 | 13 | 10 | — | 0.008 | 0.17 | 0.13 | 0.7 | 0/500 |
| Example 3 | 55 | 22 | 8 | 15 | — | 7 | 0.009 | 0.32 | 0.25 | 1.2 | 0/500 |
| Example 4 | 46 | 39 | 9 | 7 | — | 13 | 0.008 | 0.43 | 0.35 | 0.7 | 0/500 |
| Example 5 | 35 | 30 | 15 | 20 | 7 | — | 0.009 | 0.39 | 0.31 | 1.8 | 7/500 |
| Comparative Example 1 | 47 | 46 | 7 | — | 7 | — | 0.008 | 0.63 | 0.51 | 0.5 | 0/500 |
| Comparative Example 2 | 68 | — | 7 | 25 | 13 | — | 0.009 | 0.68 | 0.57 | 0.7 | 0/500 |
| Comparative Example 3 | 55 | 30 | 15 | — | — | 7 | 0.008 | 0.54 | 0.51 | 0.7 | 250/500 |

DMT: Dimethyl terephthalic acid.
DMI: Dimethyl isophthalic acid.
DMS: Dimethyl 5-sodium sulfo isophthalic acid.
BDS: Bis (4-carboxyphenyl) dimethyl silane dimethylester.
DEG: Diethylene glycol.
TEG: Triethylene glycol.

We claim:

1. A water-soluble copolymerized polyester resin composition comprising 50~85 mol % of aromatic dicarbonic acid, 0.5~25 mol % of aromatic dicarbonic acid containing sulfonic acid alkali metallic base and 0.5~25 mol % of dicarbonic acids containing silane system represented by the following formula (I) to the total dicarbonic acid components, wherein the glycol components contained in the composition comprising more than 60 mol % of aliphatic or alicyclic glycol and 1~ mol % of diethylene glycol or triethylene glycol

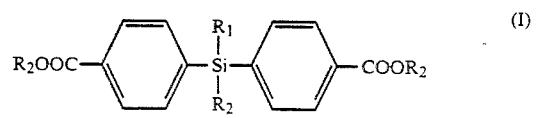

wherein,

R$_1$ is aliphatic hydrocarbon group of 1 to 15 carbon atoms, R$_2$ is aliphatic hydrocarbon group of 1 to 4 carbon atoms.

* * * * *